United States Patent [19]

Wessel et al.

[11] 4,174,692

[45] Nov. 20, 1979

[54] FUEL INJECTION DEVICE

[75] Inventors: Wolf Wessel, Oberriexingen; Gerhard Stumpp, Stuttgart; Heinrich Knapp, Leonberg, all of Fed. Rep. of Germany

[73] Assignee: Robert Bosch GmbH, Stuttgart, Fed. Rep. of Germany

[21] Appl. No.: 842,996

[22] Filed: Oct. 17, 1977

[30] Foreign Application Priority Data

Nov. 17, 1976 [DE] Fed. Rep. of Germany ....... 2652347

[51] Int. Cl.² ............................................. F02M 39/00
[52] U.S. Cl. ........................... 123/139 AW; 261/44 F
[58] Field of Search ................. 123/139 AW, 139 BG; 261/44 F, 44 A, DIG. 56

[56] References Cited

U.S. PATENT DOCUMENTS

| 1,397,500 | 11/1921 | Buhl | 261/DIG. 56 |
| 1,534,212 | 3/1923 | Hess | 261/44 A |
| 1,547,296 | 1/1922 | Bullard | 261/DIG. 56 |
| 1,611,347 | 11/1919 | Hartwell | 261/44 A |
| 2,038,785 | 9/1933 | Gould | 261/44 |
| 2,190,314 | 2/1940 | Firth | 261/44 A |
| 2,232,351 | 2/1941 | Udale | 261/44 F |
| 2,798,705 | 7/1957 | Lawrence, Jr. | 261/44 F |
| 3,880,125 | 4/1975 | Kammerer et al. | 123/139 AW |
| 4,079,718 | 3/1978 | Holzbaur | 123/139 AW |

FOREIGN PATENT DOCUMENTS

| 2349075 | 4/1974 | Fed. Rep. of Germany ... 123/139 AW |
| 2515195 | 10/1976 | Fed. Rep. of Germany ... 123/139 AW |

Primary Examiner—Charles J. Myhre
Assistant Examiner—R. A. Nelli
Attorney, Agent, or Firm—Edwin E. Greigg

[57] ABSTRACT

A fuel injection device for mixture compressing, externally ignited internal combustion engines, which serves to meter the fuel proportional to the intake air and aspirates the air-fuel mixture. The fuel injection device includes an air flow rate meter located downstream of a butterfly valve in the air induction tube. The bearing shaft of the air flow rate meter includes a fuel metering valve which can be activated directly by the air flow rate meter. To correct the air-fuel mixture because of air density downstream of the butterfly valve, the fuel injection device is so arranged, that when the butterfly valve is in its idling and full load positions a rich air-fuel mixture can be regulated, and when the butterfly valve is in a partial load position a lean mixture can be regulated.

11 Claims, 7 Drawing Figures

FUEL INJECTION DEVICE

BACKGROUND OF THE INVENTION

The invention relates to an air flow rate meter for use in the fuel supply system of a mixture compressing externally ignited internal combustion engine. The air flow rate meter is disposed movably within the induction tube of the engine and is subject to a restoring force. Its displacement becomes a measure of the aspirated air quantity. In known fuel injection systems of this general type, the air quantity flowing through the induction tube is measured by an air flow rate meter and fuel is metered out proportional to the air quantity separately for each engine cylinder and is injected separately by individual injection valves in the vicinity of each cylinder. In such a construction, the lateral surfaces of the air flow element cooperate with the induction tube walls to provide a sealing function which prevents air flow in between the two surfaces into the induction tube region downstream of the flow meter. Such a leakage air flow would alter the downstream pressure and would result in an erroneous indication by the air flow rate meter. However, the clearance between the cooperating surfaces cannot be made arbitrarily small because vibrations and temperature changes, for example, could result in dimensional changes that would affect the operational reliability if the clearance between the two surfaces were too small. A fuel injection device is already known, in which the air flow rate meter is arranged in the air induction tube downstream of the butterfly valve. This arrangement has the disadvantage, that the changing air density downstream of the butterfly valve causes an undesirable change of the fuel-air mixture.

OBJECT AND SUMMARY OF THE INVENTION

The primary object of the present invention is to provide an air flow metering element for a fuel injection system in which the restoring force for the flow meter can be decreased as the butterfly valve opens to increase pressure in the air induction tube downstream of the butterfly valve.

This invention has the further advantage, that over the entire operational area of the internal combustion engine, a favorable air-fuel mixture can be regulated, and in fact this can be done so that a rich mixture results under full-load, a lean mixture results under partial load, and a rich, well-combustible mixture also results in the idling and engine overrunning ranges.

Further advantages of the invention result from the good mixture in the partial load range because of the high pressure differential and the resulting air velocities at the air flow rate meter.

Especially advantageous is the direct activation of the fuel supply metering valve which is arranged in the bearing shaft of the air flow rate meter and the injection of the metered fuel through the air flow rate meter in the area of the greatest air flow velocity in the air induction tube. In this manner, lower travel times of the mixture from the injection point to the cylinders of the internal combustion engine are attained, and a better mixture results by means of the butterfly valve not becoming wet.

The invention will be better understood as well as further objects and advantages thereof become more apparent from the ensuing detailed description taken in conjunction with the drawings.

DESCRIPTION OF THE PREFERRED EMBODIMENT

Figure 1:
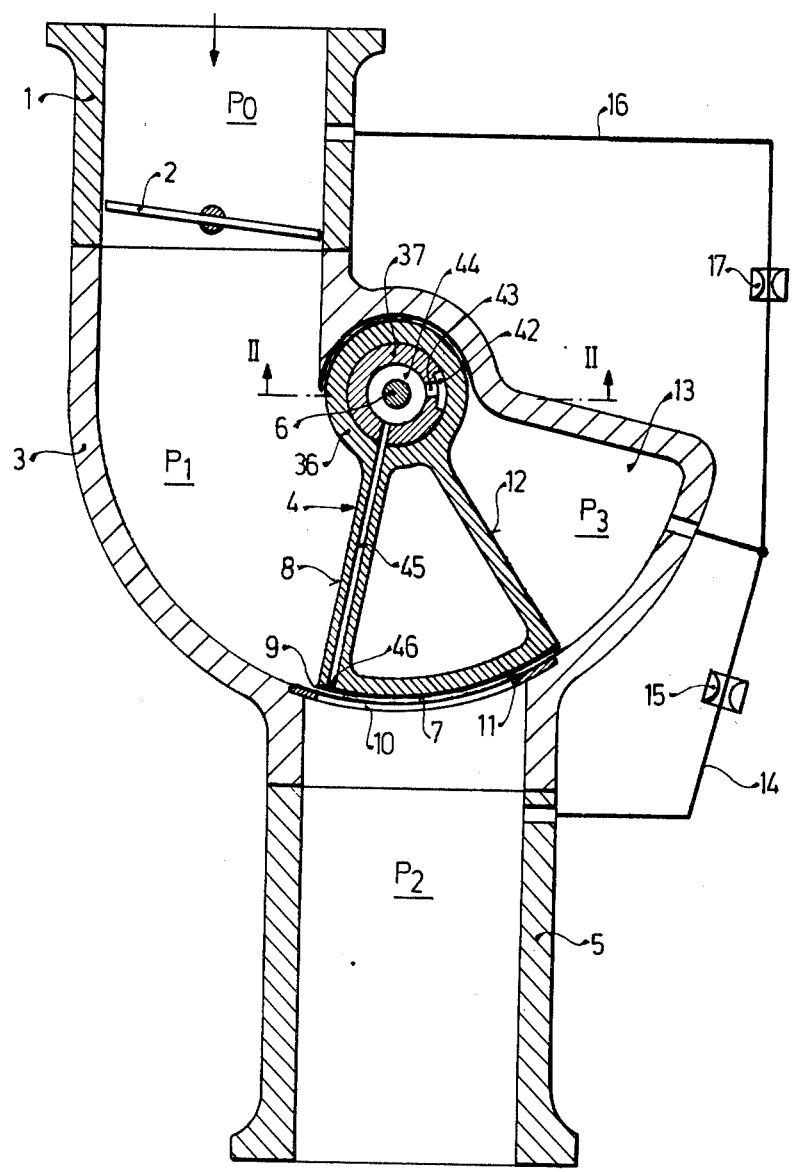
FIG. 1 is a cross section through a first exemplary embodiment of a fuel injection system.

Referring now to the fuel injection device illustrated in FIG. 1, the combustion air downstream of an air filter (not shown) flows in the direction of the arrow into a section 1 of the air induction tube having a throttle device, which is arbitrarily activated, and which is formed as a butterfly valve or throttle valve 2. From there the air flows through a section 3 of the air induction tube containing an air flow rate meter or air flow responsive member 4 and through an air induction tube 5 to one or more cylinders (not shown) of an internal combustion engine. The air flow rate meter 4 which is formed as a cylindrical segment-type rotary slide, is mounted across the direction of the air flow, and can rotate around a bearing shaft 6. The side surface 8 of the air flow rate meter that faces the air flow, controls an aperture 10 which defines the air induction tube cross section by means of its control edge 9 opposite the bearing axis 6, in dependence on the intake air quantity.

The aperture 10 is advantageously arranged in an aperture plate 11 that is seated in the opening that extends to the air induction tube 5. The side surface 12 of the air flow rate meter 4 opposite the air flow, oscillates into a chamber 13 when the air flow rate meter opens. This chamber 13 is connected by means of a conduit 14 through a first throttle valve element 15 with the air induction tube 5 downstream of the air flow rate meter 4. Further, by means of a conduit, the chamber 13 is also connected through a second throttle valve element 17 with the air induction tube 1 upstream of the butterfly valve 2.

Figure 2:
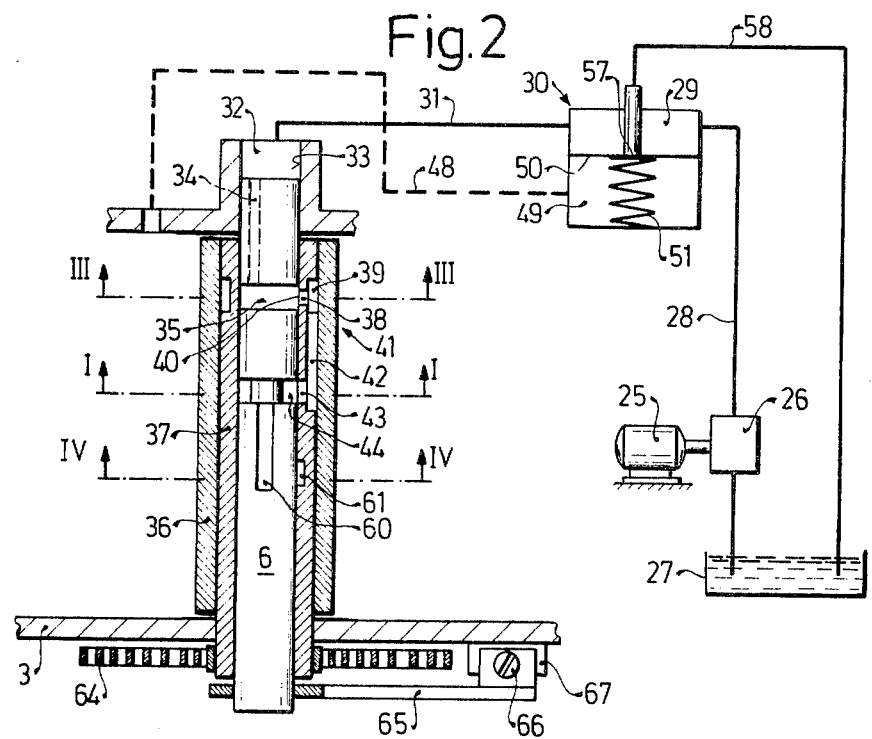
FIG. 2 is a section along the line II—II in FIG. 1.

Turning now to FIG. 2, it will be seen that fuel is supplied to the system by an electric motor 25 which drives a fuel pump 26 that aspirates fuel from a fuel container 27 and delivers it via a line 28 to a chamber 29 within a differential pressure valve 30. From the chamber 29, fuel flows through a line 31 into a chamber 32 which is defined by the end face of the bearing shaft 6 and its guide bore 33 in an extension of the induction tube wall. A bore 34, shown in broken lines in FIG. 2, establishes communication of the chamber 32 with a groove 35 worked into the bearing shaft 6. The air flow rate meter 4 includes a collar 36, which is firmly connected with a rotatable bushing 37 on the bearing axle 6. The bushing 37 has a control slot 38 terminating in an annular groove 39. The control slot 38 cooperates with a control edge 40 (see FIG. 3) which is formed by the end surface of the groove 35 in the bearing shaft. Depending on the position of the air flow rate meter 4 the control edge 40 opens the control slot 38 to varying degrees for metering out a fuel quantity proportional to the aspirated air flow rate. Thus, the control edge 40 and the control slot 38 together form a fuel metering valve 41 within the bearing shaft 6 of the air flow rate meter 4. The metered fuel flows from the annular groove 39 through a groove 44 in the bearing shaft 6. From the annular groove 39 the measured fuel travels through a groove 42 and an opening 43 in the bushing 37 into an annular groove 44 of the bearing shaft 6. The annular groove 44 communicates with a line 45 (FIG. 1), which empties near the control edge 9 either toward the air flow direction or next to the surrounding surface 7 through a discharge opening 46 into the part of the aperture opening 10 that is opened by the control surface 9 and thereby into the area of the greatest air flow velocity. The discharge opening 46 can also be divided into several discharge openings (not shown), or be replaced by an injection aperature or an injection valve.

Fuel is metered out at the metering valve 41 with a constant pressure differential. For this purpose, a chamber 49, which is separated from the chamber 29 of the differential pressure valve 30 by a diaphragm 50, communicates with the air induction tube 3 upstream of the air flow rate meter 4 through an air line 48 shown by a broken line, so that the same pressure prevails in the chamber 49 as does that downstream of the control slot 38. The differential pressure valve 30 is urged to close by a spring 51 within the chamber 49. The differential pressure valve 30 is embodied as a flat seat valve whose diaphragm 50 is its movable valve member which cooperates with a fixed valve seat 57 over which fuel may flow into a return line 58 which terminates in the fuel container 27. The differential pressure valve serves at the same time as a system pressure control valve.

To better prepare the air-fuel mixture, the metered fuel is displaced by air before the injection. For this purpose, the annular groove 44 is in communication with means defining an air aperture 62 by means of a groove 60 and an annular groove 61. This air aperture 62 terminates in the air induction tube 3 upstream of the air flow rate meter 4.

The air flow rate meter rotates against the force of a spiral spring 64, which is connected on one of its ends with the rotatable bushing 37 and on its other end with a stop on the air induction tube (not shown). The basic setting of the fuel metering valve 41 can be changed by rotating the bearing shaft 6 by means of an adjusting lever 65 and an adjusting screw means 66 which is supported on a stop 67 on the housing as shown.

The above-described fuel injection system according to the present invention operates as follows:

When the engine is running, the fuel pump 26 aspirates fuel from the container 27 and delivers it through the line 28 to the fuel metering valve 41. At the same time, the engine aspirates air through the air induction tube sections 1, 3, and 5, by means of which the air flow rate meter 4 experiences a certain rotation out of its rest position.

According to the rotation of the air flow rate meter 4, the control surface 9 opens the aperture 10 to a greater or lesser degree. The direct control of the fuel metering valve 41 by the air flow rate meter 4 results in a linear ratio of aspirated air to metered fuel when the return force and air pressure are constant. The fuel is metered with a pressure differential held constant by the differential pressure valve 30 so that by changing the closing force on the diaphragm 50, a matching to the various operational values of the engine are possible by changing the pressure differential.

The arrangement of the fuel metering valve 41 in the bearing shaft 6 of the air flow rate meter 4, and the injection of the metered fuel through the air flow rate meter 4 in the area of the greatest air flow velocity downstream of the throttle valve 2 offers the advantage of short fuel lines and low mixing times between the point of injection and the cylinders of the engine. By preventing the throttle valve 2 from becoming wet with fuel, a better mix distribution results because of the lower wall film effect on the metered fuel.

The following relationship exists between the aspirated air mass per time unit Q and the flow cross section A of the aperture 10, which is opened by the control surface 9 of the air flow rate meter 4, $$Q = \mu \cdot A \sqrt{2 \Delta p \cdot \rho},$$

whereby $\mu$ is the flow-through value, $\Delta p$ is the pressure differential at the air metering device and $\rho$ is the air density. The rigid coupling according to the invention between the position of the air flow rate meter 4 that determines the air flow cross section A and the position of the fuel metering valve, which determines the fuel metering cross section, results in a steady ratio between the air rate, which is determined by the flow cross section A and the metered fuel rate, as long as the pressure differential at the fuel metering valve and the return force on the air flow rate meter as well as the air density are constant.

In its first approximation, an efficient fuel injection device should, as its first function, produce an air fuel mixture with a constant air ratio $\lambda$. That means, that with a prescribed air mass Q, the same flow cross section A will always be opened, independent of the momentary air density $\rho$.

If the air flow rate meter is arranged downstream of the butterfly valve, then a strong change of the air density $\rho$ at the air flow rate meter occurs because of the changing air pressure downstream of the butterfly valve. It is now being attempted, according to the invention, to correct the change of the air ratio $\lambda$, which results from the change of the air density $\rho$, so that a certain approximately constant air ratio $\lambda$ results. For this purpose, it is necessary to hold the product (p.) as constant as possible. In other words to reduce the pressure differential at the air flow rate meter when the butterfly valve 2 is opening, and the air induction tube pressure upstream of the air flow rate meter is therefore climbing. By means of a corresponding arrangement of the fuel injection device, a curve of the air ratio over the air induction tube pressure $P_1$ downstream of the air flow rate meter can be achieved in the manner shown in FIG. 5. In this regard, the air induction tube pressure $p_1$ in the full-load position of the butterfly valve 2 is the same as the air induction tube pressure $P_o = 1$ bar upstream of the butterfly valve 2. Furthermore, the same air ratio should be able to be regulated for two points on the curve, for example, for the points $P_1 = p_o = 1$ bar and $p_1 = \frac{1}{2} p_o$. The curve of the air ratio $\lambda$ illustrated in FIG. 5 can be achieved with the first exemplary embodiment of the invention shown in FIG. 1. This is accomplished because with the above conditions being present the pressure $p_3$ prevailing in the chamber 13 can be changed in dependence on the air induction tube pressure $p_2$ downstream of the air flow rate meter. In this process, given that $p_3 = p_2 + K(p_o - p_2)$, a throttle ratio K is supplied by $$\frac{K}{1-K} = 4\frac{p_{VL}}{p_o},$$

whereby $p_{VL}$ designates the pressure differential at the air flow rate meter during full load. This throttle ratio K corresponds to the pressure drop at the throttling point 15 with regard to the overall pressure drop at the throttle points 15, 17. The air ratio λ is given by $$\lambda = c\sqrt{\frac{1}{[1 + \frac{4}{p_o}(p_o - p_1)] \cdot \frac{p_1}{p_o}}},$$

whereby c represents a proportionality factor, which can be adjusted by the width of the control slot 38.

Figure 5:
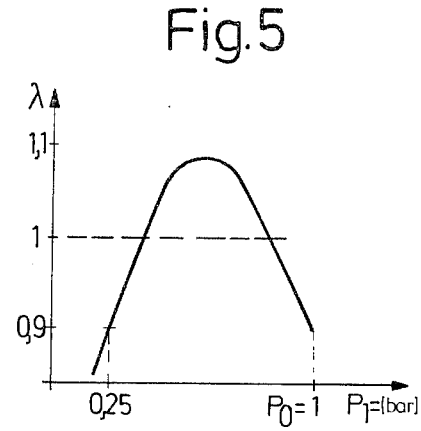
FIG. 5 is a diagram, which represents the curve of the air ratio $\lambda$ in dependence on the air induction tube pressure downstream of the air flow rate meter.

This favorable function curve of the air ratio λ, shown in FIG. 5, has the result, that in the idling and engine braking (overrunning) operation of the engine a rich air fuel mixture that is favorable to combustion can be regulated. Also, in the partial load range a lean air-fuel mixture that is favorable to consumption can be regulated, and in the full-load range as well a performance-favorable rich air-fuel mixture can be regulated.

Figure 6:
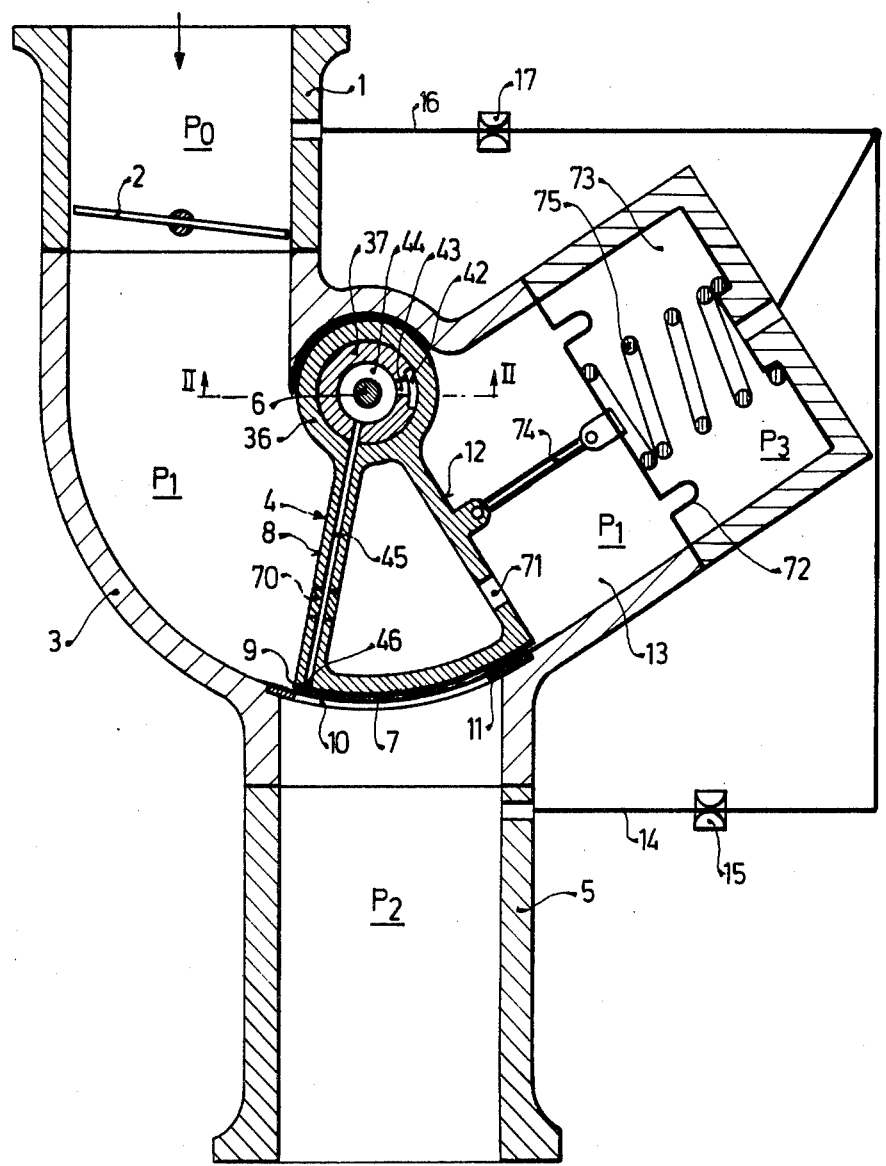
FIG. 6 is a cross section through a second exemplary embodiment of a fuel injection device.

In the second exemplary embodiment of the invention according to FIG. 6, the elements corresponding to those illustrated in FIG. 1 are given the same reference numerals.

Figure 3:
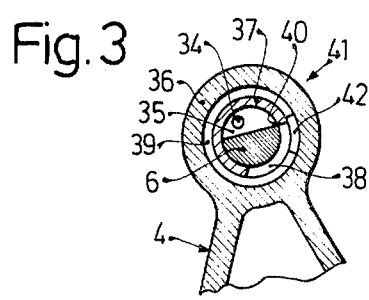
FIG. 3 is a section along the line III—III in FIG. 2.
Figure 4:
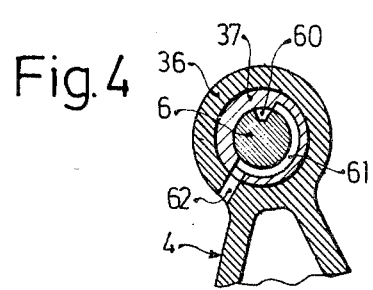
FIG. 4 is a section along the line IV—IV in FIG. 2.

The fuel supply and metering proceeds according to the manner explained on the basis of FIGS. 2 through 4. In the first exemplary embodiment, according to FIG. 1, there is a possibility of failure because of a leaking crack below the air flow rate meter, by means of which the throttle ratio K is attuned. In the second exemplary embodiment according to FIG. 6, therefore, the chamber 13 is in communication with the air induction tube pressure $P_1$ upstream of the air flow rate meter 4, and is separated by a flexible diaphragm 72 from a control chamber 73, which, in turn, is in communication with the firt throttle point 15 with the air induction tube section 5 downstream of the air flow rate meter by means of the conduit 14, and with the second throttle point 17 with the air induction tube section 1 upstream of the butterfly valve by means of the conduit 16. The diaphragm 72 is connected with the air flow rate meter 4 by means of a lever bar 74. But, this connection can also just as well be afforded by a geared rack drive such as that illustrated in FIG. 7.

In contrast to the exemplary embodiment, according to FIG. 1, the return force in the exemplary embodiment according to FIG. 6 is not produced by a spiral spring, but rather by a compressible spring, which acts on the diaphragm 72 and is arranged in the control chamber 73, to thereby urge it toward the closed position of the air flow rate meter 4. The exemplary embodiment according to FIG. 6 offers the advantage that the air flow rate meter 4 can be formed smaller, since the diaphragm surface 72 is determinative of force. Under the conditions as mentioned with regard to FIG. 1, the same curve of the air ratio, as shown in FIG. 5, results for the embodiment according to FIG. 6 as for the embodiment according to FIG. 1.

Figure 7:
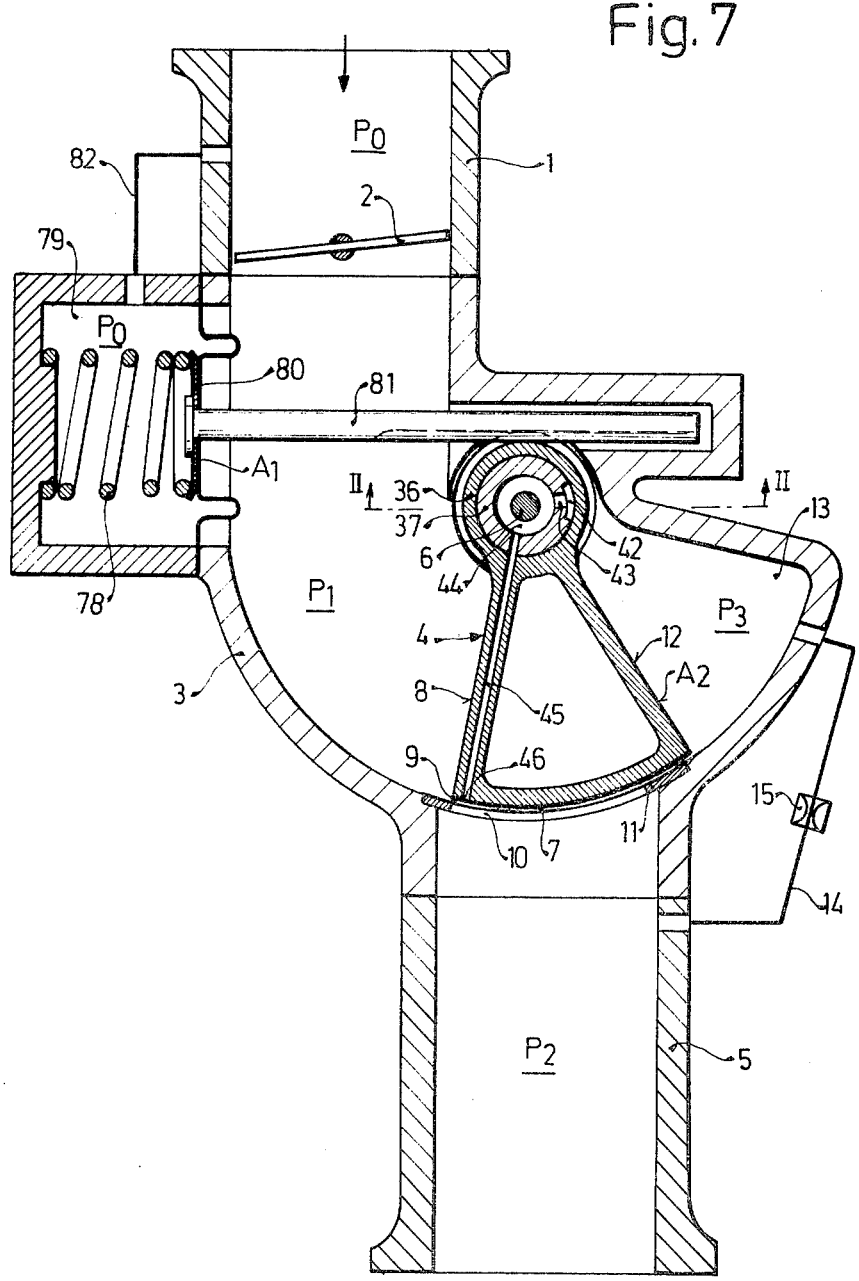
FIG. 7 is a cross section through a third exemplary embodiment of a fuel injection device.

In the third exemplary embodiment of the invention as shown in FIG. 7, those elements that function the same as those described in connection with the first embodiment in FIG. 1 are designated with the same reference numerals. In this embodiment the fuel is supplied and metered in the manner shown in FIGS. 2 through 4. In contrast to the embodiment in FIG. 1, the air induction tube pressure $P_2$ downstream of the air flow rate meter 4 prevails in the chamber 13, into which the air flow rate meter 4 protrudes during its opening movement. The throttle valve element 15 in the conduit 14 which connects the chamber 13 and the air induction tube section 5 has only the purpose of damping the air induction tube fluctuations caused by the intake strokes of the engine. The return force on the air flow rate meter 4 is produced, in the embodiment according to FIG. 7, not by a spiral spring, but rather by a compressible spring 78, which is supported against a soft flexible diaphragm 80 in a control chamber 79. This diaphragm 80 is acted upon on its side opposite the compressible spring 78 by the air induction tube pressure $P_1$ upstream of the air flow rate meter. A geared rack drive 81 is connected with the diaphragm 80, which cooperates with the collar 36, which is formed as a ring gear. In place of the ring gear drive a lever drive such as that shown in FIG. 6, for example, can be disposed between the diaphragm 80 and the air flow rate meter 4. The control chamber 79 is arranged to communicate with the air induction tube section upstream of the butterfly valve 2 through a conduit 82, so that the air induction tube pressure $p_o$ prevails in the control chamber 79. By means of an appropriate construction of the diaphragm surface $A_1$ of the diaphragm 80 and the air flow rate meter surfaces $A_2$ of the side surface 12, a curve of the air ratio such as that shown in FIG. 5 can be maintained. According to the conditions as mentioned with regard to the first exemplary embodiment of this invention according to FIG. 1, the relation for the surfaces $A_1$ and $A_2$ is given by $$\frac{A_1}{A_2} = \frac{K}{1-K}.$$

Thus, for the exemplary embodiment according to FIG. 7, the same advantageous curve of the air ratio results over the various operational ranges of the internal combustion engine. For all three exemplary embodiments the further advantage exists in the consumption-advantageous, lean air-fuel mixture in the partial load range, of a good mixture by means of great air velocities at the air metering device resulting from the greater pressure differential.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A fuel injection device for mixture compressing, externally ignited internal combustion engines provided with an arbitrarily actuated throttle valve and a pivotally mounted air flow responsive member incorporated with a fuel metering valve rotatably disposed in an air induction tube and means for subjecting said air flow responsive member to a restoring force in the closing direction in opposition to the force of air flow, the improvement wherein said air flow is arranged downstream of said throttle valve and including a return force means, said air flow responsive member including one surface that oscillates into a chamber, said chamber being connected with said air induction tube downstream of the air flow responsive member by means of a first throttle valve element, and with said air induction tube upstream of said throttle valve by means of a second throttle valve element, said restoring force being dependent on the pressure in said chamber so as to decrease the pressure of said return force means as said throttle valve opens to thereby cause an increase of the pressure in said air induction tube downstream of said throttle valve.

2. A fuel injection device according to claim 1, in which said pressure distribution ratio K of the throttling cross sections of said first and said second throttle valve element is arranged so that in the idling, shear, and full load positions of said throttle valve a rich air-fuel mixture can be regulated, and in the partial load position of said throttle valve a lean air-fuel mixture can be regulated.

3. A fuel injection device according to claim 1, in which said air flow responsive member is associated with an elastic member subjected to pressure $P_1$ on one side thereof in said air induction tube upstream of the air flow responsive member said elastic member further being capable of closing a control chamber provided with a pressure spring, said control chamber arranged to be in communication with said air induction tube downstream of said air flow responsive member by means of a first throttle valve element, and further with an air induction tube upstream of said throttle valve by means of a second throttle valve element.

4. A fuel injection device according to claim 3, in which said pressure distribution ratio K of the throttling cross sections of said first and said second throttle valve elements is chosen so that in the idling, shear, and full-load positions of said throttle valve a rich air-fuel mixture can be regulated, and in the partial load position of said throttle valve a lean air-fuel mixture can be regulated.

5. A fuel injection device according to claim 3, in which said elastic member comprises a soft, flexible diaphragm.

6. A fuel injection device according to claim 1, in which said air flow responsive member includes one surface that oscillates into a chamber, said chamber being in communication with said air induction tube downstream of the air flow responsive member and actuatable by an elastic member subjected to pressure $p_1$ on one side in said air induction tube upstream of the air flow responsive member, and on the other side is arranged to close a control chamber provided with a pressure spring that is arranged to close the air flow responsive member, said control chamber being connected with said air induction tube upstream of said throttle valve.

7. A fuel injection device according to claim 6, in which said elastic member includes surfaces $A_1$ and $A_2$, said surfaces together with said air flow responsive member being arranged so that in the idling, shear and full-load positions of said throttle valve a rich air-fuel mixture can be regulated, and in the partial load positions of said throttle valve a lean air-fuel mixture can be regulated.

8. A fuel injection device according to claim 7, in which said elastic member comprises a soft, flexible diaphragm, and the air flow responsive member can be activated by the diaphragm by means of a geared rack drive.

9. A fuel injection device according to claim 1, in which said air flow responsive member has a cross section resembling a circular sector arranged to penetrate said air induction tube, said circular sector including one surface arranged to open said air induction tube.

10. A fuel injection device according to claim 9, in which said fuel metering valve is arranged in a bearing shaft of said air flow rate meter.

11. A fuel injection device according to claim 10, in which said fuel metering valve includes means through which fuel is metered into the air induction tube.

* * * * *